(12) United States Patent
Beck et al.

(10) Patent No.: US 11,996,535 B2
(45) Date of Patent: May 28, 2024

(54) MICRO-ARCHITECTED FLOW THROUGH ELECTRODES FOR ENERGY STORAGE

(71) Applicant: Lawrence Livermore National Security, LLC, Livermore, CA (US)

(72) Inventors: Victor Alfred Beck, Livermore, CA (US); Sarah Baker, Dublin, CA (US); Jonathan Tesner Davis, Oakland, CA (US); Eric Duoss, Dublin, CA (US); Daniel Tortorelli, Champaign, IL (US); Seth Evan Watts, Collingswood, NJ (US); Marcus A. Worsley, Hayward, CA (US)

(73) Assignee: LAWRENCE LIVERMORE NATIONAL SECURITY, LLC, Livermore, CA (US)

(*) Notice: Subject to any disclaimer, the term of this patent is extended or adjusted under 35 U.S.C. 154(b) by 0 days.

(21) Appl. No.: 17/667,489

(22) Filed: Feb. 8, 2022

(65) Prior Publication Data

US 2022/0255165 A1    Aug. 11, 2022

Related U.S. Application Data

(60) Provisional application No. 63/148,072, filed on Feb. 10, 2021.

(51) Int. Cl.
*H01M 10/6568* (2014.01)
*C25B 9/15* (2021.01)
(Continued)

(52) U.S. Cl.
CPC .......... *H01M 10/6568* (2015.04); *C25B 9/15* (2021.01); *C25B 9/70* (2021.01); *C25B 11/032* (2021.01);
(Continued)

(58) Field of Classification Search
None
See application file for complete search history.

(56) References Cited

U.S. PATENT DOCUMENTS

| | | | | |
|---|---|---|---|---|
| 2012/0258345 | A1* | 10/2012 | Zaffou | H01M 4/861 429/105 |
| 2013/0252041 | A1* | 9/2013 | Fujimoto | H01M 4/8636 429/70 |

(Continued)

OTHER PUBLICATIONS

Nieuwoudt et al, Evaluating the Impact of Resistance in Carbon Nanotube Bundles for VLSI Interconnect Using Diameter-Dependent Modeling Techniques, IEEE Transactions on Electron Devices, vol. 53, No. 10, Oct. 2006 (Year: 2006).*

(Continued)

*Primary Examiner* — Ula C Ruddock
*Assistant Examiner* — Mary Grace Byram
(74) *Attorney, Agent, or Firm* — Perkins Coie LLP

(57) ABSTRACT

Disclosed are electrochemical reactors with electrodes that have variable porosity across the electrode. The electrodes are designed and micro-architected to have variable porosity and 3D flow. In one aspect, an electrochemical cell apparatus is disclosed. The apparatus includes an electrochemical vessel and an electrochemical fluid contained in the electrochemical vessel. The apparatus further includes a porous electrode submerged in the electrochemical fluid in the electrochemical vessel, the porous electrode having different porosities in different areas of the porous electrode. The different porosities inhibit electrochemical fluid flow and increase electrical conductivity in first areas of the porous electrode with decreased porosity compared to second areas, and enable increased electrochemical fluid flow and (Continued)

decrease electrical conductivity in the second areas of the porous electrode with increased porosity compared to the first areas.

18 Claims, 10 Drawing Sheets
(9 of 10 Drawing Sheet(s) Filed in Color)

(51) Int. Cl.
| | |
|---|---|
| C25B 9/70 | (2021.01) |
| C25B 11/032 | (2021.01) |
| H01M 4/04 | (2006.01) |
| H01M 4/86 | (2006.01) |
| H01M 4/88 | (2006.01) |
| H01M 10/6561 | (2014.01) |
| C25B 3/26 | (2021.01) |
| H01M 4/02 | (2006.01) |
| H01M 8/18 | (2006.01) |

(52) U.S. Cl.
CPC ........... *H01M 4/04* (2013.01); *H01M 4/8605* (2013.01); *H01M 4/861* (2013.01); *H01M 4/88* (2013.01); *H01M 10/6561* (2015.04); *C25B 3/26* (2021.01); *H01M 2004/021* (2013.01); *H01M 8/18* (2013.01)

(56) References Cited

U.S. PATENT DOCUMENTS

| | | | |
|---|---|---|---|
| 2018/0048008 A1* | 2/2018 | Johnston | H01M 4/88 |
| 2018/0248195 A1* | 8/2018 | Choi | H01M 4/505 |

OTHER PUBLICATIONS

Chung, Ding-Wen, et al., "Validity of the Bruggeman relation for porous electrodes," Modelling Simul. Mater. Sci. Eng. 21(7):074009, 2013.

Gerhardt, Michael R., et al., "The Effect of Interdigitated Channel and Land Dimensions on Flow Cell Performance," Journal of The Electrochemical Society 165(11):A2625-A2643, 2018.

Lazarov, B. S., et al., "Filters in topology optimization based on Helmholtz-type differential equations," International Journal for Numerical Methods in Engineering 86(6):765-781, 2011.

Newman, John S., et al., "Theoretical Analysis of Current Distribution in Porous Electrodes," Journal of The Electrochemical Society 109(12): 1183-10, 1962.

Newman, John, et al., "Porous-electrode theory with battery applications," AIChE Journal 21(1):25-41, 1975.

Othmer, C., "A continuous adjoint formulation for the computation of topological and surface sensitivities of ducted flows," Int. J. Numer. Meth. Fluids 58(8):861-877, 2008.

Shah, A.A., et al., "A dynamic performance model for redox-flow batteries involving soluble species," Electrochimica Acta 53(27):8087-8100, 2008.

Tahir, M. A., et al., "Influence of fiber orientation on the transverse permeability of fibrous media," Physics of Fluids 21(8):083604, 2009.

Trainham, James A, et al., "A Flow-Through Porous Electrode Model: Application to Metal-Ion Removal from Dilute Streams.", Journal of The Electrochemical Society 1977, 124 (10), 1528-1540., 1977, pp. 1528-1540.

* cited by examiner

MICRO-ARCHITECTED FLOW THROUGH ELECTRODES FOR ENERGY STORAGE

CROSS-REFERENCE TO RELATED APPLICATIONS

This patent document claims priority to, and the benefit of, U.S. Provisional Patent Application No. 63/148,072 entitled "MICRO-ARCHITECTED FLOW THROUGH ELECTRODES FOR ENERGY STORAGE" filed on Feb. 10, 2021. The entire content of the aforementioned patent application is incorporated by reference as part of the disclosure of this patent document.

STATEMENT REGARDING FEDERALLY SPONSORED RESEARCH

This invention was made with government support from the U.S. Department of Energy under Contract DE-AC52-07NA27344. The government has certain rights in the invention.

TECHNICAL FIELD

This patent document relates to electrochemical reactors.

BACKGROUND

Electricity generated from renewable sources is a continually growing component of global energy production and a key driver for a sustainable energy future. Further expansion requires efficient and cost-effective integration into existing power distribution systems but intermittency and curtailment remain a challenge. A number of strategies have emerged to address these issues, including electrochemical energy storage and repurposing otherwise wasted electricity to electrify chemical manufacturing. The direct electrochemical conversion of $CO_2$ is an especially powerful avenue as it simultaneously combines storage, chemical synthesis, and carbon-removal. As these advances are translated from the laboratory to industrial scale, energy efficient operation will become increasingly important to ensure economic viability.

SUMMARY

Disclosed are micro-architected variable porosity 3D flow through electrochemical reactors. As a specific application, flow through electrodes are designed using the disclosed techniques for energy storage in vanadium redox flow batteries. Modeling, simulation and optimization methodology is disclosed including using high resolution continuum simulation to develop a homogenized description of the constituent microstructure unit cell. Optimal distributions of the spatially varying unit cell porosities is determined to maximize power efficiency across operating conditions. In some example embodiments, computing methods are used The resultant designs are evaluated for their power performance and compared to bulk, porous flow through electrodes. The mechanisms leading to improved power efficiency are identified and applied to the underlying electrode structure. Also described is how the computational design methodology can be used to scale-up electrodes while minimizing power efficiency losses. The disclosed design methodology provides a framework for architecting 3D electrodes using the design freedom provided by advanced and additive materials manufacturing techniques.

In one aspect an electrochemical cell apparatus is disclosed. The apparatus includes an electrochemical vessel, and an electrochemical fluid contained in the electrochemical vessel. The apparatus further includes a porous electrode submerged in the electrochemical fluid in the electrochemical vessel, the porous electrode having different porosities in different areas of the porous electrode. The different porosities inhibit electrochemical fluid flow and increase electrical conductivity in first areas of the porous electrode with decreased porosity compared to second areas, and enable increased electrochemical fluid flow and decrease electrical conductivity in the second areas of the porous electrode with increased porosity compared to the first areas.

The following features can be included in various combinations. The porous electrode is divided into a plurality of unit cells comprising at least five unit cells. At least one unit cell compared to other unit cells has at least one of a different: porosity; surface area; conductivity; permeability; or mass transfer property. The plurality of unit cells is configured to contain an internal structure to the unit cell. The internal structure comprises one or more rods, and wherein a diameter of the one or more rods is selected to adjust a porosity of the unit cell. The one or more rods of a first unit cell having a larger diameter than the one or more rods of a second unit cell causes the first unit cell to have a lower porosity than the second unit cell. The one or more rods of a first unit cell having a larger diameter than the one or more rods of a second unit cell causes the first unit cell to have a lower ohmic resistance than the second unit cell. Changing the internal structure of the unit cell changes one or more of: a surface area; a conductivity; a permeability; a mass transfer; or a movability or permeation of gas bubbles. The porosities of the plurality of unit cells are selected to adjust one or more localized features of the porous electrode comprising: a fluid distribution; an electrical resistance; a species reaction; or a flow resistance. The electrochemical cell apparatus is configured as a fuel cell. The electrochemical cell apparatus is configured as a battery. The electrochemical cell apparatus is configured as a flow-through electrochemical reactor. The electrochemical cell apparatus is configured as a flow distribution system. The electrochemical cell apparatus is configured as an electroactive component. The porous electrode is configured as a porous flowfield plate. The porous flowfield plate is positioned adjacent to an electroactive component. Each of the plurality of unit cells has a dimension on at least one side thereof that is between 100 nm and 100 microns. The porous electrode has pore sizes between 100 nm and 100 microns. The electrochemical fluid comprises a mixture of a liquid and a gas, and wherein the mixture includes bubbles of the gas entrained in the liquid.

In another aspect a method of selecting porosities in an electrochemical reactor is disclosed. The method includes dividing an electrode of the electrochemical reactor into a plurality of unit cells, and determining a plurality of porosities for the plurality of unit cells as a function of a location for each of the plurality of unit cells, wherein each location in the electrode provides a selected fluid flow property and a selected conductive property to meet one or more performance metrics.

The following features can be included in various combinations. The one or more performance metrics comprise one or more of: a maximum energy density of the electrochemical reactor; a maximum efficiency of a chemical reaction in the electrochemical reactor; or a gas movement or permeation property of the electrochemical reactor. The one or more performance metrics comprise one or more of: an ionic resistance; a flow resistance; a kinetic resistance; or an ohmic resistance.

BRIEF DESCRIPTION OF THE DRAWINGS

This application contains at least one drawing executed in color. Copies of this application with color drawing(s) will be provided by the Office upon request and payment of the necessary fees.

DETAILED DESCRIPTION

Figure 1:
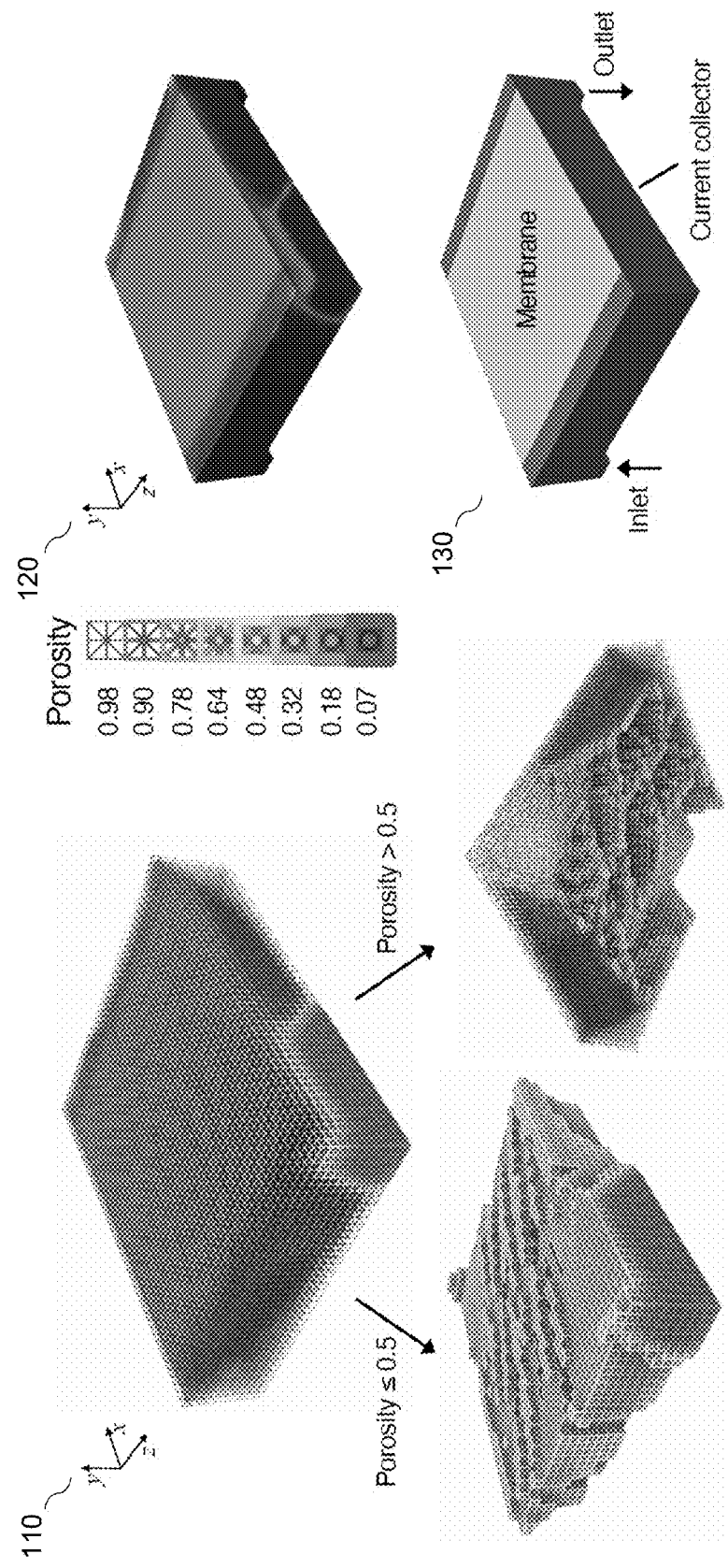
FIG. 1 shows an example of an electrode divided into regular isotruss unit cells composed of rods or fibers with equal radius.

Section headings are used below to aid clarity without limiting the combinations of features that can be combined from the various sections.

Disclosed are electrochemical cells with porous electrodes such as flow cells where fluid passes through the cell and interacts with the porous electrodes. The disclosed porous electrodes can have porosity with different values at different locations in the cell. The different values can be selected to optimize the performance of the cell according to one or more performance metrics. Disclosed are computational processes for optimizing the porosities at the different locations in the cell according to the performance metrics. The same processes can be applied to fixed cells, or non-flow cells, such as a battery. In some example embodiments, the fluid is a liquid-gas mixture where the fluid has gas bubbles entrained inside the liquid.

Porous flow-through electrodes are used as a core reactor component across applications including electrochemical energy storage using redox flow batteries, and others. Flow battery performance can be tied to the porous electrode properties. The electrode can be a disordered, homogeneous collection of micron-scale, electroactive particles like carbon fibers, felts or spherical substrates, any of which may be further coated with a catalyst. These materials seek to maximize the surface reaction while minimizing overpotential and hydraulic losses. However, the material properties to meet these requirements can be adversarial and can present a challenge in attaining high performance. Open structures may be necessary to allow fluid penetration, promote mass transfer, reduce pumping losses and supply reactants to the surface, but permeable geometries may reduce the solid fraction and require low hydrodynamically accessible surface area. In turn, the increasing porosity, decreasing intrinsic surface area, and lower overall conductance lead to greater kinetic and Ohmic losses.

Some demonstrations of high-power flow batteries have circumvented these issues by enabling the use of very thin electrodes. The improved performance can be attributed in part to the significantly decreased area specific resistances relative to thicker electrodes, like uncompressed carbon felts. Controlling electrode thickness and compression can be an effective, bulk parameter to control the gross electrode microstructure, impacting average conductance, permeability, and mass transfer.

To further drive performance, some architectures use sophisticated flowfields to distribute reactants across the electrode surface. This approach partially externalizes the challenges of balancing mass transport and electrochemical losses from the electrode to the fluid distribution system, providing further design freedom but with increased complexity. Earlier studies have employed a combination of numerical, and combined numerical and experimental, approaches to develop engineering guidelines for flowfield channel dimensions and layouts to maximize peak power and efficiency. Some work has employed X-ray computed tomography to simultaneously assess the impact of non-uniform compression and flowfield arrangement, thus connecting bulk engineering parameters to the electrode microstructure and its effective properties.

Engineering the electrode structure directly can improve performance. Holes made using laser perforation can be used to create mass transport channels in carbon paper electrodes and increase peak power. Slots milled into a large-scale carbon felt electrode can improve fluid distribution and decrease pumping losses without employing a costly flowfield. Dual-scale electrodes created by etching carbon papers or combining electrospun fiber mats with a backing layer can enable even more granular engineering of the structure. Similar dual-scale concepts can be used for lithium-ion electrodes and extended to create continuously variable porosity electrodes which have been demonstrated to lead to improved rate capability while maximizing energy density.

Additive and advanced manufacturing techniques can be employed to further extend and control the structural complexity of electrode materials. Porous electrodes with superior mass transport can be created from carbon and graphene aerogels using direct ink writing for use in supercapacitors. Flow through electrodes made from metals, including nickel and stainless steel, can be produced at varying scales with complex, flow-controlling architectures. The resolution of the 3D printed, flow-through electrodes leads to feature sizes that exceed those of conventional electrodes by 1-2 orders of magnitude. However, several advanced manufacturing technologies exist with resolution between micrometers and tenths of micrometers or even smaller sizes using materials that are suitable for use as electrodes. The control of the sizes of structures provided by these fabrication techniques (e.g., 3D printing, molding, casting, etc.) cannot be fully exploited without analysis and design tools to guide the electrode architecture Design tools, such as the tools disclosed in this patent document, can be used to develop a detailed understanding of the transport and electrochemical processes in flow batteries. These tools have provided design guidance, identified control variables, and provided useful heuristics highlighting the importance of flow uniformity when engineering the electrode assembly.

In some example embodiments, the disclosed design methodology involves beginning with an initial system architecture, analyzing the system, and then improving it via design iteration. In some example embodiments, design processes, such as topology optimization can be used to invert the design process and aide in the phase-space exploration. For example, a performance target for one or more performance metrics can be specified and a computing process can be iterated over permissible architectures to meet the target. This can lead to designs which are high performance, such as a flowfield design in flow batteries and fuel cells. Similar design concepts can be used to design the structure of flow through electrodes.

In some example embodiments, micro-architected variable porosity 3D flow through electrochemical reactors are designed using a computing process. As an example, flow through electrodes for vanadium redox flow batteries have been designed using the disclosed process. The process can include modeling, simulation and/or optimization methodology, including the use of high-resolution continuum simulations to develop a homogenized description of the constituent microstructure unit cell. Some example architectures are selected to allow for the movement or permeation of gas bubbles. The design process determines optimal distributions of the spatially varying unit cell porosities to maximize power efficiency across operating conditions. The resultant architectures can be evaluated for their power performance and compared to bulk, porous flow through electrodes. The mechanisms leading to improved power efficiency are identified and connected to the underlying electrode structure. The disclosed computational design methodology can be used to scale-up electrodes while minimizing power efficiency losses. The design methodology provides a framework for generating high performance, architected 3D electrodes which can fully exploit the design freedom from advanced and additive materials manufacturing techniques.

Example Methods

A combination of modeling, simulation and computational design optimization can be used to generate the 3D architected porosity electrodes. The disclosed techniques are applicable to dilute, single-phase, flow-through porous electrochemical reactors, as well as other applications. The methodology can be applied to determine optimal electrode architectures for electrochemical energy storage applications. The electrode can be modeled in a negative half-cell of a vanadium flow-through battery and the electrode architecture optimized to minimize the power loss at fixed flow rates and discharge currents.

FIG. 1 at 110 shows an example of a variable porosity, micro-architected electrode. The electrode is split into portions with unit cells with porosity above and below 0.5 for visualization. The porosity is controlled by fixing the unit cell length but allowing the rod diameter to vary. The unit cell size is arbitrary and is chosen to be large in this example to aide with visualization. FIG. 1 at 120 shows an example of a micro-architected electrode that can be described with a spatially varying continuous porosity field (same legend as at 110). FIG. 1 at 130 shows an example of a design domain that is the negative half-cell compartment of a vanadium flow battery. In this example, the current collector and membrane have dimensions of 2 cm×2 cm. The inlet and outlet are square with area 0.02 cm×0.02 cm. The compartment overall dimension is 2.4 cm×2 cm×0.5 cm.

As shown in FIG. 1, the electrode is divided into regular, isotruss unit cells composed of rods/fibers with equal radius. The fiber radius of these component cells is allowed to vary spatially. Advanced manufacturing work suggests scales and resolutions that would permit the manufacture of porous carbon electrodes at a scale of, for example, 100 cm² with square unit cells of length L=50 µm. Other sizes can also be used. Assuming equal print resolution for both the void and the solid, the fiber radius, r, may vary from $r_{min}$=1.25 µm to $r_{max}$=11.25 µm, or another size. In some example embodiments, the unit cell length is fixed, and thus the fiber radius can be used to control the porosity and surface area per unit volume of the unit cell, directly impact the electrochemical, mass transport, and hydrodynamic response of the electrode as described below. The resultant designed lattice architecture can be readily transformed into a surface file and used as input for advanced manufacturing techniques.

Continuum Simulation

Using 3D simulations, the negative half-cell of an all vanadium flow-through battery is modeled using porous electrode theory. Every point in the continuum represents both liquid and solid and is characterized by the local porosity as determined by the local rod radius of the unit cell, $\epsilon=\epsilon(\vec{x})$. Note that because the unit cell rod radius changes with position, $r=r(\vec{x})$, the transport properties of the system will also be position dependent.

The electrolyte is a solution of $V^{2+}/V^{3+}$ in 1M sulfuric acid. The mass balance expression for the reactive species $i \in \{V^{2+}, V^{3+}\}$ is, $$\vec{\nabla} \cdot (\vec{v} c_i - D_i \vec{\nabla} c_i) = a j_{n,i}, \quad \text{Equation (1)}$$

where $c_i$ is the species concentration, $D_i$ is the effective diffusivity of the species in the liquid, a is the specific area per volume, and $\vec{v}$ is the superficial velocity. Additionally, a high, constant conductivity solution is assumed and electromigration is ignored. The mass transfer flux from the solid is the product of the mass transfer coefficient and the difference between the surface and bulk concentrations: $j_{n,i} = k_m(c_i^s - c_i)$. The current density from the surface reaction ($V^{3+} + e^- \rightarrow V^{2+}, U_0$) is modeled using the Butler-Volmer expression, $$i_n = k_0(c_{V(II)}^s e^{\beta \Delta \Phi} - c_{V(III)}^s e^{-\beta \Delta \Phi}), \quad \text{Equation (2)}$$

where $k_0$ is the rate constant, $\beta = F/2RT$, and we define $\Delta \Phi \equiv \Phi_1 - \Phi_2 - U_0$ using the solid, $\Phi_1$, and liquid, $\Phi_2$, potentials. The current density is related to the surface species flux through Faraday's Law, $i_n = F j_{n,V^{3+}} = -F j_{n,V^{2+}}$. The liquid and solid potentials are modeled using Ohm's law, $$-\vec{\nabla} \cdot (-\sigma \vec{\nabla} \Phi_1) = \vec{\nabla} \cdot (-\kappa \vec{\nabla} \Phi_2) = a i_n, \quad \text{Equation (3)}$$

where $\sigma$ and $\kappa$ are the effective conductivities of the solid and liquid, respectively. Finally, the flow field in the porous medium is determined from the Stokes-Brinkman equation, $$\mu \nabla^2 \vec{v} - \frac{\mu}{\alpha} \vec{v} = \vec{\nabla} p, \quad \text{Equation (4)}$$

where µ is the liquid viscosity, p is the pressure, and α is the position dependent permeability.

The design domain in this example is the negative half-cell electrode compartment of a discharging vanadium flow through battery as show in FIG. 1 at 130. For a specified flow rate, Q, and inlet area $A_{in}$, the velocity at the inlet is set to a uniform velocity normal to the boundary, $$\vec{v} = \frac{Q}{A_{in}}\vec{n},\qquad\text{Equation (5)}$$

The inlet species concentration is fixed at $c_i$=1M. The top portion of the domain is adjacent to the membrane, and a fixed current density is specified as the boundary condition, $$-\kappa\frac{\partial\Phi_2}{\partial\vec{n}} = \frac{I}{A},\qquad\text{Equation (6)}$$

where I is the applied current and A is the membrane area. The bottom boundary opposite the membrane is the surface of the current collector with boundary condition, $\Phi_1$=0. The domain exits to zero pressure, and all other flow boundary conditions are wall-type boundaries with no-slip boundary conditions for the velocity and no-flux boundary conditions for the pressure. All other scalar boundary conditions are no-flux (i.e., homogeneous Neumann) boundary conditions.

TABLE 1

Physical Parameters

| Parameter | Value | Units | Ref |
|---|---|---|---|
| $D_{V^{2+},0}$ | $2.4 \times 10^{-10}$ | m²/s | |
| $D_{V^{3+},0}$ | $2.4 \times 10^{-10}$ | m²/s | |
| $\kappa_0$ | 40 | S/m | Estimate |
| $\sigma_0$ | $10^4$ | S/m | |
| $U_0$ | −0.25 | V | |
| $k_0$ | $1.75 \times 10^{-7}$ | m/s | |
| T | 300 | K | Assumed |
| μ | $8.9 \times 10^{-3}$ | Pa-s | Assumed |

Homogenization

The electrochemical, transport, and hydrodynamic responses of the unit cells as a function of the rod radius must be determined to apply a porous electrode model. A 3D resolved, microscopic model of the isotruss unit cell in FIG. 1 at 110 is developed. The intrinsic area per volume and porosity depend on the ratio of the internal rod radius to the fixed unit cell edge length, L. A computer aided design tool, such as Starccm+ or other analysis method, can be used to calculate this relationship for several values of r/L. These points can be fit using a spline to produce the curves such as those in FIG. 2 at 220. These properties are position dependent:

$$a=a(r(\vec{x})),\qquad\text{Equation (7)}$$

$$\epsilon=\epsilon(r(\vec{x})).\qquad\text{Equation (8)}$$

For the diffusive and conductive properties, the Bruggeman relation is employed, and these properties are also position dependent, $$D_i=D_{i,0}[\epsilon(r(\vec{x}))]^{3/2},\qquad\text{Equation (9)}$$

$$\kappa=\kappa_0[\epsilon(r(\vec{x}))]^{3/2}\qquad\text{Equation (10)}$$

$$\sigma=\sigma_0[1-\epsilon(r(\vec{x}))]^{3/2}\qquad\text{Equation (11)}$$

with $D_{i,0}$ the molecular diffusivity of species i, and $\kappa_0$, and $\sigma_0$ are the conductivities of the liquid and solid, respectively. The physical parameters used are listed in Table 1.

Figure 2:
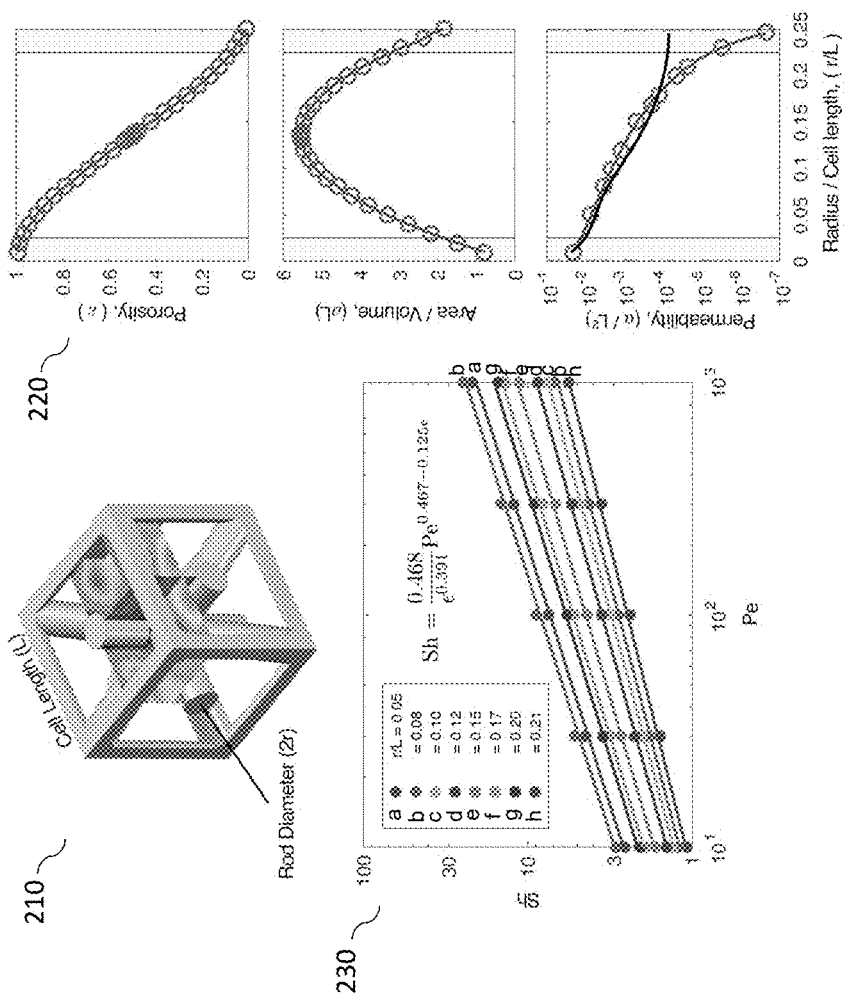
FIG. 2 shows an example of an isotruss unit cell with various features.

FIG. 2 at 210 shows an example of an isotruss unit cell with an illustrative planar slice of the resolved CFD computation in the interior of the cell. FIG. 2 at 220 shows an example of the dependence of the porosity, area per volume, and permeability on r/L. The blue regions are outside of the range of permitted fiber radii given by $r_{min}$ and $r_{max}$ for the architectures designed in this work. The permeability plot includes a comparison, in black, to a correlation for fibrous media. The symbols are the results from CFD and the blue lines are spline fits FIG. 2 at 230. The unit cell Sherwood number, Sh, is presented as a function of the unit cell Péclet number, Pe, and the unit cell porosity, $\epsilon$. The symbols are the results from CFD and the curves correspond to the correlation equation, as shown.

The permeability is determined by meshing the void domain in the unit cell and calculating the steady, fully-developed velocity field for an applied pressure drop (we assume Re≪1). Following Darcy's Law, the slope of the linear response of the superficial velocity, $\vec{v}$, against pressure is used to determine the permeability, $$\alpha=\alpha(r(\vec{x})).\qquad\text{Equation (12)}$$

Note that for the isotruss the permeability tensor is isotropic and characterized by a single scalar component. These values of permeability are also fit to a spline and are compared in FIG. 2 at 220 against correlations for fibrous porous media. The correlations are expected to be accurate only for dilute fiber beds (i.e., high porosity), and there is good agreement with the calculation as the fiber radius to unit cell length ratio decreases.

The mass transport properties of the unit cell are determined by using the convection-diffusion equation to simulate the transport and surface-consumption of a dilute species assuming perfectly adsorbing fiber surfaces. Because creeping flow is assumed, there is no Re dependence, and the only parameters are the species Pe=r|$\vec{v}$|/$D_{i,0}$ and the porosity. Simulations are performed across Pe and $\epsilon$ to calculate the effective mass transfer coefficient $$k_m \equiv \frac{|\vec{v}|}{aL}\left(1 - \frac{\langle c_{out}\rangle}{\langle c_{in}\rangle}\right),\qquad\text{Equation (13)}$$

where $\langle\cdot\rangle$ is the axial velocity average (i.e., mixing-cup average). The simulated values of the effective non-dimensional mass transfer coefficient, Sh≡$k_m r/D_0$ is then fit to yield the correlation shown in FIG. 2 at 230. In the dilute limit, the expression reduces to Sh≈$0.468Pe^{0.342}/\epsilon$ and is in nearly exact agreement with a previous experimentally informed and frequently used correlation. Note that because of the porosity and velocity dependence, the mass transfer coefficient is also position dependent:

$$k_m=k_m[\epsilon(r(\vec{x})),Pe(\vec{v}(\vec{x}))].\qquad\text{Equation (14)}$$

Optimization

Using the continuum, forward model for the electrochemical and homogenized response of the system, the total power loss for any porosity distribution can be calculated.

The power loss objective function is defined as the sum of the electric power losses, $P_{elec}$, and the hydraulic power losses, $P_{flow}$:

$$P_{tot} = P_{elec} + P_{flow}, \quad \text{Equation (15)}$$

with, $$P_{elec} = \int_{mem} \eta \, \vec{i}_2 \cdot \vec{n} \, d\Gamma, \quad \text{Equation (16)}$$

an integral over the electrode-membrane interface, and $$P_{flow} = \int_{in} \frac{p \vec{v} \cdot \vec{n}}{\Psi_{pump}} d\Gamma, \quad \text{Equation (17)}$$

an integral over the inlet. The current density in the liquid is given by $\vec{i}_2$. The local overpotential is defined as, $\eta = \Phi_{1,cc} - \Phi_{2,mem} - U_0$, where $\Phi_{1,cc} = 0$ is the potential at the current collector, $\Phi_{2,mem}$ is the potential at the interface between the electrode and the membrane, and the Nernst potential only contributes the standard potential since the inlet concentrations of oxidant and reductant are set equal. The power efficiency is thus defined as $\Xi = 1 - P_{tot}/IU_0$. In this work, the pump efficiency is idealized and assumed to be $\Psi_{pump} = 1$. Lower pump efficiency is equivalent to an increased weighting of the flow contribution to the objective function as seen in Equation (17).

We seek to determine the distribution of unit cells with rod radius, $r(\vec{x})$, which will minimize the total power loss, $P_{tot}$:

$$\min_{r(\vec{x})} P_{tot} \quad \text{Equation (18)}$$
$$\text{s.t.} \quad r_{min} \leq r(\vec{x}) \leq r_{max}.$$

The total derivative, $dP_{tot}/dr(\vec{x})$, subject to the constraints imposed by the physical model in Equations (1)-(4) is calculated using partial differential equation (PDE) techniques for constrained optimization. The continuous adjoint approach is employed to derive analytical expressions for the adjoint PDEs. This results in one adjoint PDE per forward model PDE. For a given solution of the forward model, the adjoint PDEs are numerically solved. The total derivitative (i.e., sensitivity) is then computed from the forward solution, adjoint solution, and partial derivative of the Lagrangian function with respect to the design variables. The porosity distribution is updated using the Method of Moving Asymptotes (MMA). Iteration continues until the average relative change in the objective function over the last 5 steps is less than $10^{-4}$, to arrive at a local optimum for the rod distribution. A Helmholtz filter can be used to regularize the optimization problem and control the smoothness length scale of the porosity variation. The length scale parameter is set to 200 μm The forward simulation, adjoint calculation, and gradient descent update can be performed using bespoke code written using, for example, OpenFOAM. The domain is meshed using $\approx$1.2M cubic, finite-volume cells.

The ultimate power efficiency of a flow through electrode can be engineered by balancing the losses arising from insufficient mass transport to the reactive surfaces against the hydraulic power necessary to drive fluid to those surfaces and provide charge conduction pathways. The power losses in flow through electrodes composed of isotrusses is characterized and design optimization can be applied to a three-dimensional model of coupled fluid flow, species transport, and current distribution.

Characterizing Power Losses in Flow Through Electrodes

Figure 3:
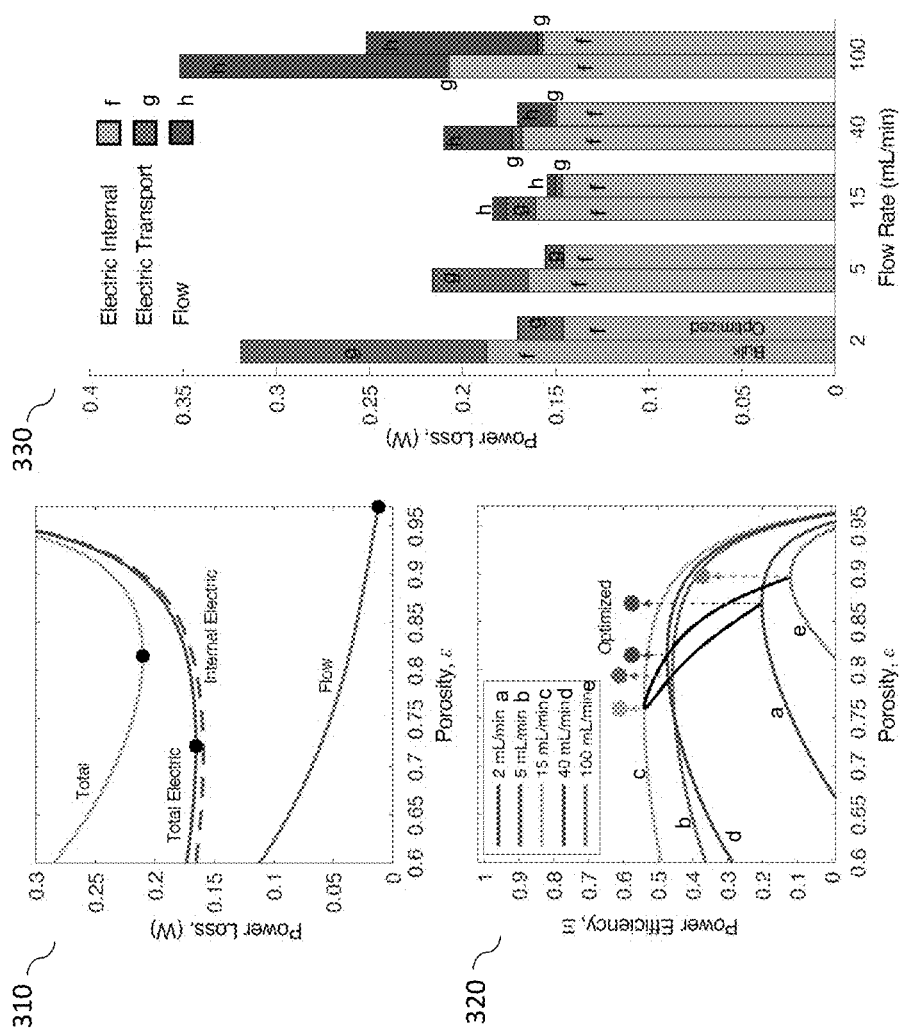
FIG. 3 shows examples of power loss and power efficiency.

Shown in FIG. 3 at 310 is the porosity dependence of the total power loss in a bulk, monolithic electrode used as the negative half-cell of a vanadium flow-through battery (i.e., a homogeneous electrode which can be described by a single value for the porosity). At a fixed input flow rate of 40 mL/min and operating current density of 400 mA/cm² the minimum power loss occurs when using an electrode with bulk porosity $\epsilon = 0.815$. Equivalently, the electrode is a uniform set of lattices with rod radius r=3.7 μm. The total power loss is decomposed via Equations (15)-(17) into contributions from hydraulic losses and electric losses to reveal that this minimum results from a trade-off between each component. The flow losses decrease as the porosity of the electrode increases, with a minimum hydraulic power loss occurring at the highest attainable porosity. This is as expected, as the more open structure will have higher permeability. Alternatively, $\epsilon \to 1$ represents a singular limit for the electric losses since both Ohmic and kinetic overpotential losses grow unbounded as the solid material disappears. Instead, the electric losses generally decrease with increasing solid fraction since this increases reactive area and the effective solid conductivity, lowering Ohmic and surface overpotential losses.

FIG. 3 at 310 shows an example of the total power loss separated into total electric and flow components for a bulk electrode, characterized by a single porosity, operated at 40 mL/min and 400 mA/cm². The total electric power loss is further separated into the portion due to concentration polarization and the portion due to internal electric resistance. The location of the minimum from each contribution is marked. FIG. 3 at 320 shows an example of power efficiency at a fixed current density of 400 mA/cm² as the porosity and flow rate are varied. The solid lines show the power loss for a bulk, monolithic electrode. The black curve is the loci of power loss minima. The arrows show the increase in efficiency for the optimized electrode. FIG. 3 at 330 shows an example of the total power loss, separated into hydraulic losses, internal electric losses, and electric transport losses is presented for both the bulk and optimized electrodes at fixed current density of 400 mA/cm². The histogram couplets correspond on the left to the power losses for the bulk electrode at its optimal porosity (i.e., the maxima at 320 and the right to the optimized, architected, variable porosity electrode.

The electric losses pass through a minimum at $\epsilon = 0.711$ and eventually begin to increase as the porosity further decreases. Increasing the solid fraction hinders transport to the reactive surface by displacing fluid, changing the local mass transfer coefficients, and decreasing the liquid conductivity. To better differentiate these effects, the internal electric loss, $P_{int}$, is determined by simulating an electrode wherein we prescribe the surface concentrations of all species to be equal to the inlet concentrations, reducing the problem to the solution of Equation (3). This idealization removes all concentration variations and hence all concentration polarization losses, and it is conceptually equivalent to canonical work on one-dimensional porous electrode models. The concentration polarization power loss is thus defined as, $$P_{trans} = P_{elec} - P_{int}.$$  Equation (19)

The internal electric loss has contributions only from Ohmic and kinetic overpotential losses, while the concentration losses will include contributions from variations in both the concentration and the mass transfer coefficients. We thus equivalently refer to the concentration polarization losses as electric losses due to insufficient species transport, or simply electric transport losses. The internal power loss plotted in FIG. 3 at 310 is the dominant contribution to the total electric power loss and the dominant loss in general. At this flow rate and current, the transport losses are generally too small to impact the optimal porosity, but it is noted that these losses increase as the void volume is reduced.

Minimizing Power Losses in Flow Through Electrodes

The total power efficiency, Ξ, in bulk electrodes operating at flow rates ranging from 2-100 mL/min is shown in FIG. 3 at 320. All of the power efficiency curves are similar and have a single optimal porosity that balances the flow and electric power losses. A spline fit to the loci of the curve maxima yields the expected optimal porosity as the flow rate is varied. At 400 mA/cm$^2$ the most efficient bulk electrode operates at the maximum of this spline curve. Equivalently, the minimum power loss is attained when operating at 15 mL/min with a bulk electrode porosity of ϵ=0.761.

In the disclosed techniques, the geometry can vary spatially throughout the electrode by changing and optimizing the rod radius in each fixed unit cell. The optimization approach discussed above is used to determine a distribution of unit cell rod radii, $r(\vec{x})$, which minimizes the total power loss. At each flow rate and current density, the initial input to the optimization process is the corresponding minimum bulk porosity. As shown in FIG. 3 at 320, in each case the optimization process finds a distribution of radii which leads to further decreases in the total power loss and hence greater efficiency than the bulk electrode. Indeed, the highest efficiency observed in FIG. 3 at 320 is Ξ=0.614 for the optimized electrode operating at 15 mL/min, an efficiency increase over the bulk electrode of 13.5%. Across flow rates, the efficiency relative to the best performing bulk electrodes is improved by as much as 310%. This optimization procedure and analysis is repeated at current densities of 100 mA/cm$^2$ and 200 mA/cm$^2$, and in general, lower current operation leads to even higher efficiency.

The resultant locally optimal, variable porosity electrode geometries can be visualized by splitting the electrode into two volumes. The "solid" portion of the electrode lumps all unit cells with ϵ≤0.5 while the "void" portion of the electrode lumps all unit cell with ϵ>0.5. The former is more closed to fluid flow and will behave more like a pure solid (i.e., preventing flow and enhancing electrical conduction), while the latter is more open and will behave more like a void (i.e., permitting flow and reducing electrical conduction). The two portions of the designed electrode are presented in FIG. 4, and it is emphasized that though we are visualizing solid blocks, all regions in the electrode are composed of unit cells (see FIG. 1 at 110).

Figure 4:
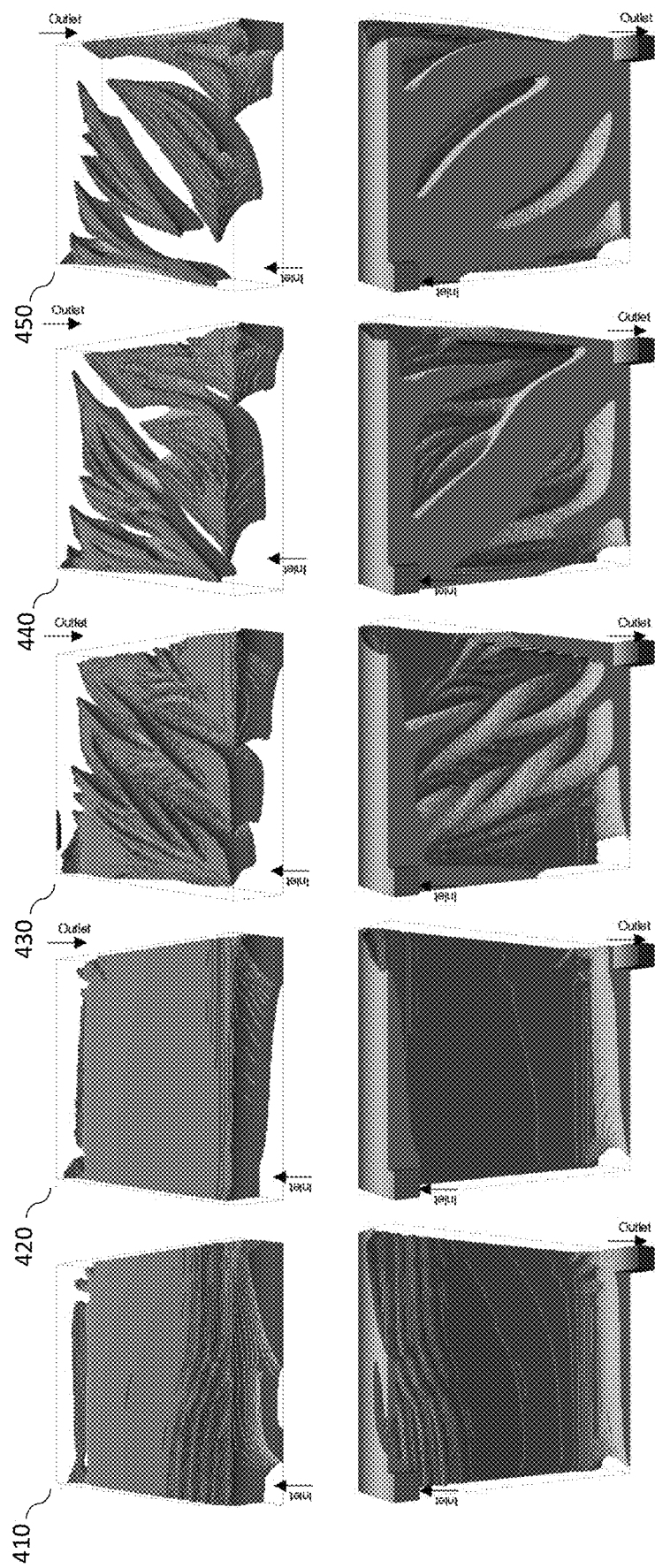
FIG. 4 shows an example electrodes with architected porosity optimized at a fixed current and for various flow rates.

FIG. 4 shows an example of architected porosity electrodes resulting from the optimization procedure at a fixed current of 400 mA/cm$^2$ and a flow rate at 410 of 2 mL/min, at 420 of 5 mL/min, at 430 of 15 mL/min, at 440 of 40 mL/min, and at 450 of 100 mL/min. To aid in visualization, the electrodes are split into a "solid" half with ϵ≤0.5, presented on the top row, and a "void" half where ϵ>0.5 presented on the bottom row. To aid in visualization, the electrodes are colored by height, with red adjacent to the membrane and blue adjacent to the current collector.

Figure 5:
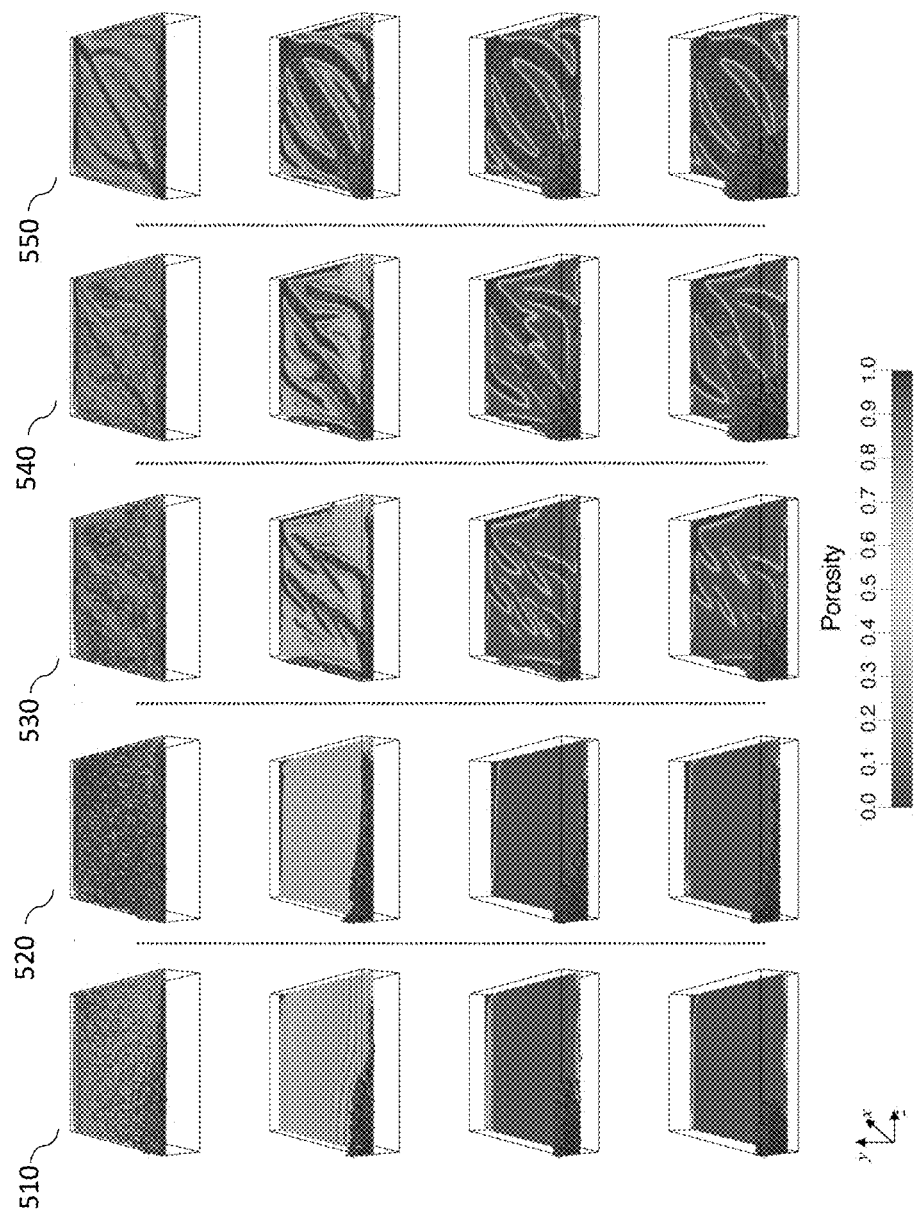
FIG. 5 shows examples of slices of porosity distribution and the flow vector field in planes parallel to the current collector.

Representative slices of the porosity distribution and the flow vector field in planes parallel to the current collector are presented in FIG. 5. At low flow rates, the optimal electrode geometry tends towards a large, mostly solid block with a thin high-flow region near the membrane. While at higher flow rates several large channels are carved into the solid block, and these grow larger with increasing flow rate. Across the designed electrodes, the porosity increases with distance from the current collector and all electrodes show a thin, high porosity, distributed flow region adjacent to the membrane.

A high efficiency optimized electrode is pictured in FIG. 4 at 430 and FIG. 5 at 530. It is a mostly solid structure near the current collector with several low porosity channels tunneling through the block that direct fluid from the current collector to the membrane. Near the membrane the number of channels increases, eventually leading to the high porosity region and appearing to spread the fluid along the membrane surface. In contrast, the electrode operated at 5 mL/min (see FIG. 4 at 410 and FIG. 5 at 510) begins by distributing the majority of the fluid along the top, upstream edge of the electrode. The channels in the highest efficiency electrode thus appear to increase the number of injection points for the fluid and distribute them throughout the volume. The variable porosity electrode is performing an analogous function to a flowfield plate, but now the flow control is integral to the electrode. Similar flow-directing structures are seen in FIG. 4 at 440 and FIG. 5 at 540, but, these are most pronounced in the best performing, architected electrode.

FIG. 5 shows an example of planar slices of the electrode porosity parallel to the current collector and membrane are presented for the architected electrode designed at flow rate at 510 of 2 mL/min, at 520 of 5 m L/min, at 530 of 15 m L/min, at 540 of 40 mL/min, and at 550 of 100 mL/min. The planes are created at 1.5 mm, 2.5 mm, 3.5 mm, and 4.5 mm from the current collector. The velocity vector field is also presented, with vector length proportional to relative velocity magnitude within each column.

Comparing Power Losses in Bulk Electrodes to Variable Porosity Electrodes

The contributions to the total power loss for the bulk electrodes are presented in the first bar of each pair in FIG. 3 at 330. At low flow rates, the electric transport losses are major contributors to the total loss in the bulk electrodes. There is insufficient mass transfer at low flow rates. Alternatively, at high flow rates the electric transport losses are small but at the cost of increased hydraulic losses. At each of these extrema the performance of the bulk electrode is maximized by using a more open porosity. At low flow rates, low porosity is necessary to enable greater mass transport, while at high flow rates it is instead the reduced flow resistance from higher permeability which is necessary to improve performance. The higher porosity also leads to lower overall conductivity and an increase in internal electric losses. The loci of maxima in FIG. 3 at 320 can be understood as an optimization over operational flow rate to find the lowest porosity value which minimizes losses associated with fluid distribution: Operation at 15 mL/min enables the use of a more solid, conductive electrode.

The architected electrodes are compared to the best performing bulk electrodes (i.e., the electrodes corresponding to the minima of the solid curves in FIG. 3 at 320) operating at the same current and flow rate. In all cases, the variable porosity, optimized electrodes lead to a reduction in all contributions to the power loss. At the low flow rates the electric transport losses due to insufficient species flow are minimized by forcing all of the flow into a thin region adjacent to the membrane, effectively creating a thin, porous electrode (i.e., FIG. 4 at 410). For high flow rates, an excess of flow amply supplies the reaction near the membrane but leads to large hydraulic losses which are minimized by carving by-passes in the thick bulk region (i.e., FIG. 4 at 450). The internal resistance of the electrodes is also lowered by using the architected porosities. However, unlike for bulk electrodes above, architected porosity relaxes the constraint between porosity and conductivity observed above for the bulk electrode allowing for increased power efficiency. The internal losses for the bulk electrode all appear to reach similar limiting values around 0.15 W. These are all lower than the internal losses observed in the bulk electrode and imply that variable porosity can improve performance even when mass transport losses are unimportant. Similar trends are observed at lower operating current densities.

Characterizing the Porosity Distribution

Figure 6:
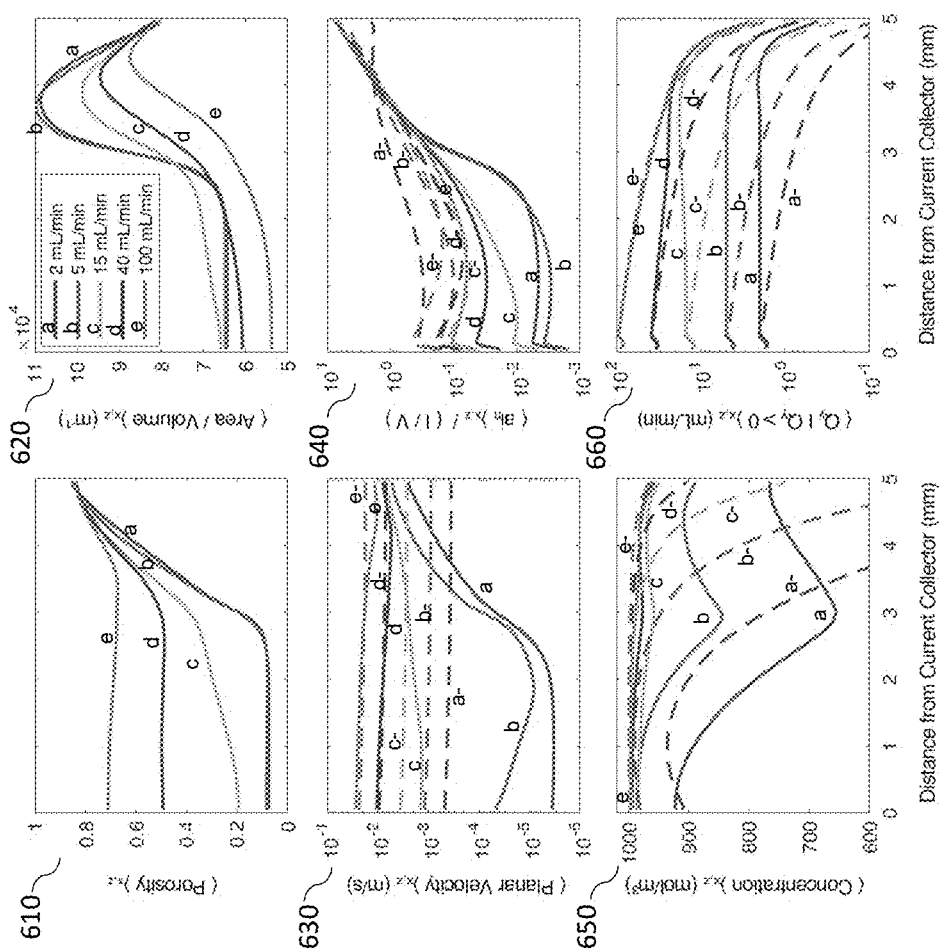
FIG. 6 shows examples of averages of porosity, area per volume, planar component of the velocity, dimensionless reaction current, and the concentration of reductant in planes parallel to a current collector, and one-way flow rate.

The porosity of the optimized electrodes can be averaged on planes directly above the current collector as presented at FIG. 6 at 610. At low flow rates, the planar averages show that the region near the current collector is near the lowest available value of the porosity, confirming that in FIG. 4 at 410 and 420 "solid" regions are indeed monolithic and as solid as possible. The optimization process has effectively created a conductive block extending from the current collector with a thickness of approximately 3 mm stacked below a 2 mm porous electrode with gradually increasing porosity. This is reminiscent of commonly recognized heuristics for engineering high power fuel cells and flow batteries which employ thin geometries with high porosity papers or felts. An important departure, however, is that in previous work the geometry is a thin flow channel with a constant porosity electrode. The variable porosity electrodes show that even for the thin, membrane adjacent 2 mm region, a smooth, gradual increase in porosity leads to greater power efficiency since the optimization procedure would adjust the porosity to be uniform near the electrode if this led to continued improvement.

FIG. 6 shows example averages of the porosity at 610, area per volume at 620, planar component of the velocity at 630, $u_{x,z}$, reaction current made dimensionless with the applied current divided by the electrode volume, V, at 640, and the concentration of the reductant in planes parallel to the current collector and located at the given height above the current collector at 650. At 660, the one-way flow rate in the direction define in Equation (21) is presented. The solid lines correspond to the variable porosity electrodes while the dashed lines correspond to the bulk electrodes at the optimal porosity (i.e., maxima of curves in FIG. 3 at 320). The current density is fixed at 400 mA/cm².

The gradual increase in porosity as the membrane is approached is true across all of the optimized electrodes, and the transition occurs at approximately the same position, 3 mm. Further, the ultimate value of the porosity at the membrane is fairly constant across all architected electrodes, $\epsilon \approx 0.84$. This value is within the range of optimal porosities determined for the bulk electrodes but exceeds the porosity of the best performing bulk electrode (e.g., the location of the maxima in FIG. 3 at 320). The physical parameters of the system suggest that in the absence of concentration polarization a characteristic length scale for the bulk electrode is the penetration depth, $$L_p = \sqrt{\frac{RT}{ai_0 F(\kappa^{-1} + \sigma^{-1})}} \qquad \text{Equation (20)}$$

which will vary with porosity, but for the range of porosities and intrinsic areas studied here is $\approx$0.1-0.9 mm. It is not obvious how to assign an equivalent characteristic length for the variable porosity electrodes, but the values are of the same magnitude as the characteristic length for the porosity variation in FIG. 6 at 610.

Enhanced Performance

The architected electrodes lead to higher power efficiencies across applied current densities and flow rates. The resultant flow, concentration and current fields for electrodes operating at 400 mA/cm² are analyzed and compared to the bulk electrode fields to understand the factors that lead to these improvements. These quantities are again averaged on planes parallel and directly above the current collector and presented in FIG. 6.

The planar averages of the reaction current density, the magnitude of the righthand side of Equation (3), normalized by the volume averaged current, I/V, are shown at FIG. 6 at 640, revealing the spatial distribution of the electrochemical reaction and thus the electrode utilization. Driving this reaction at minimal power loss is the main goal of the electrochemical engineering problem posed in this work. Recall that for the bulk electrodes the highest power efficiency was attained for the bulk electrode operating at a flow rate of 15 mL/min. When compared to the other bulk electrodes, it is evident from the current distribution that in this electrode the reaction rate near the current collector is lowest and, because the operating current is fixed, the reaction rate near the membrane is greater. All of the architected electrodes exceed the power efficiency of this bulk electrode and additionally lead to lower internal losses. These electrodes all show further decreased reaction rate in the bottom portion (i.e., the region <3 mm from current collector), and consequently greater reaction rate near the membrane, relative to the bulk electrodes. High performance electrodes drive reaction closer to the membrane, and all of the optimized electrodes show exponential growth of the reaction rate as the membrane is approached. In some of the disclosed electrodes studies, improved volumetric utilization of the electrode is not a requisite for improved power efficiency.

To maintain high reaction currents near the membrane, the reductant needs to be supplied at high molar fluxes, as quantified by the product of the local velocity and the concentration. The magnitude of the velocity projected onto the averaging plane is presented at FIG. 6 at 620. For the bulk electrodes the nearly constant average value shows that the flow is approximately evenly distributed with distance from the current collector. All of the curves are similar and scale with the applied flow rate since the permeability is constant and nearly identical across the bulk electrodes and the flow equations are linear at low Re. Because the flow vector field orientation does not change if the porosity is uniform, the only avenue for increasing reductant concentration near the membrane is to increase the flow rate. Indeed, in FIG. 6 at 630 it is only at the highest flow rates that a uniform, high concentration is attained for the bulk electrodes. At lower flow rates there is a strong depletion of the active species and thus a strong increase in the electric transport losses (see FIG. 3 at 330).

In contrast, the optimized electrodes succeed in attaining higher concentrations of the reductant through improved flow management without incurring unacceptably large hydraulic losses. At low flow rates (2-15 mL/min), the planar averages in FIG. 6 at 630 show that the variable porosity electrodes drive most of the fluid against the membrane and, with the exception of the electrode designed at 100 mL/min, exceed the flow rate of the bulk electrode operating at the same flow rate. The large velocities seen near the current collector at the highest flow rates are due to the large bypass channels seen in FIG. 4 at 440 and 450.

The impact of the flow distribution in the optimized electrodes on the concentration is evident in FIG. 6 at 650. The concentrations near the membrane of these architected electrodes are higher than their bulk counterparts, with the exception of the optimization at 100 mL/min where the optimized electrodes have led to a decrease in the concentration near the membrane. Consequently, the electric transport losses are reduced relative to the bulk electrode at all flow rates except 100 mL/min, where there is excess supply of species.

For planes parallel to the current collector, the vertical transport induced by the electrode can be determined from the flow rate crossing the plane in only one-direction:

$$\langle Q_y | Q_y > 0 \rangle_{xz} = \tfrac{1}{2} \int_{xz} |\vec{v} \cdot \vec{e}_y| + \vec{v} \cdot \vec{e}_y \, dA, \qquad \text{Equation (21)}$$

where $\vec{e}_y$ is a unit vector normal to the current collector and pointing in the direction of the membrane. It is equivalent to an integral of the vertical component of the vectors in FIG. 5 and provides a metric to quantify the vertical exchange of material. Indeed, when plotted in FIG. 6 at 660 the average one-way flow rate, $\langle Q_y | Q_y > 0 \rangle$, shows that the optimized electrodes all lead to greater flow towards the membrane relative to the bulk electrode, especially near the membrane. In contrast, for the bulk electrode the only mechanism to increase vertical transport is to increase the flow rate, but this leads to the wasteful increase of hydraulic losses throughout the electrode. Interestingly, as seen from the 40 mL/min and 100 mL/min variable porosity electrode curves, the flow of material to the membrane is not maximized, instead it is optimized toward an apparent limiting value that is nearly equivalent to the vertical transport seen in the 15 mL/min variable porosity electrode. Any supply in excess leads to unnecessary hydraulic losses (see FIG. 3 at 330).

Figure 7:
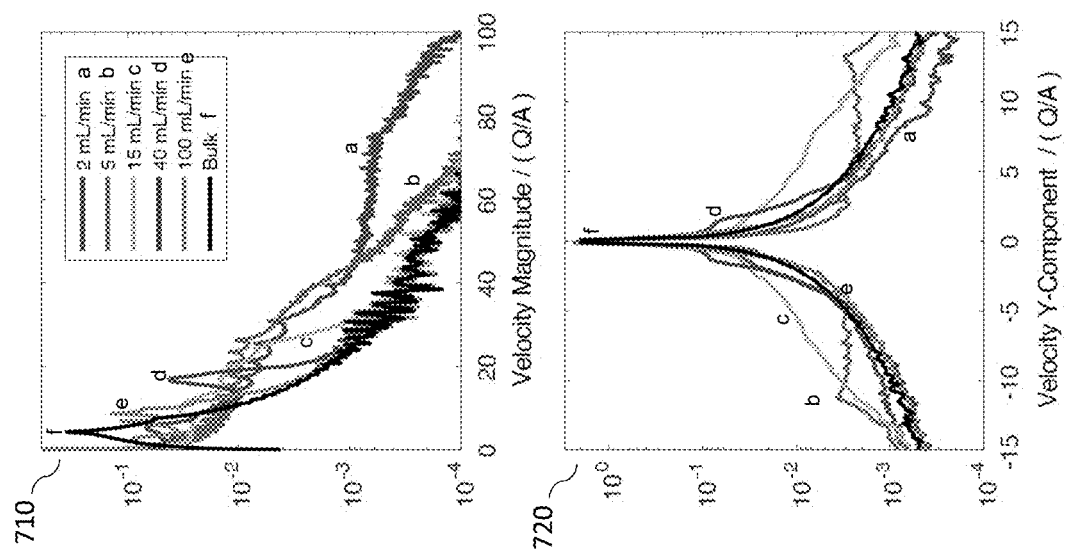
FIG. 7 shows examples of probability distribution functions of the magnitude of the velocity, and the perpendicular component of velocity as a function of the applied flow rate.

The central role of increased vertical transport is further supported by analyzing the probability distribution function of the vertical component of the velocity normalized by the area specific velocity, $Q/A_{mem}$, as shown at FIG. 7 at 710. For all of the designed electrodes the velocity distribution is much broader, and this is especially pronounced for the electrode optimized at 15 mL/min. The 15 mL/min optimized electrodes show the most induced vertical flow. FIG. 7 at 720 shows the variable porosity electrodes lead to a broader distribution of high velocities relative to the bulk electrodes. In addition to enhancing convective transport, this serves to increase the local reaction rates by increasing the flow speed dependent mass transfer coefficients.

From these observations we can interpret the resultant electrode architectures in FIG. 4. The optimization procedure is not only sculpting the gross features of the electrode, creating a thin, high porosity electrode near the membrane, it is also developing an integral flow distribution system, essentially a porous flowfield, to manage the flow paths. This is especially evident in the "braided" design seen in FIG. 4 at 430, where the architectural features may serve to distribute fluid vertically as well as to allow for maximal flow distribution, with minimal hydraulic loss, along the electrode. This interpretation focuses on flow distribution: The optimization procedure is general and simultaneously optimizes flow paths, convective paths, and conduction paths to control reaction rates and automatically arrive at an optimal architecture irrespective of analogies to other engineering approaches.

FIG. 7 shows examples of the probability distribution functions of the magnitude of the velocity at 710, and the perpendicular component of velocity at 720, $v_y$ as a function of the applied flow rate. The velocities are normalized by the area specific velocity, the ratio of the flow rate to the membrane area. The probability distribution functions for the optimal, bulk electrodes are presented in the black curves. Note that due to the linearity of the flow equations, the normalized flow field of the bulk electrodes is identical across flow rates and the probability distribution function for the bulk electrodes can be represented by a single curve labeled, "Bulk."

Figure 8:
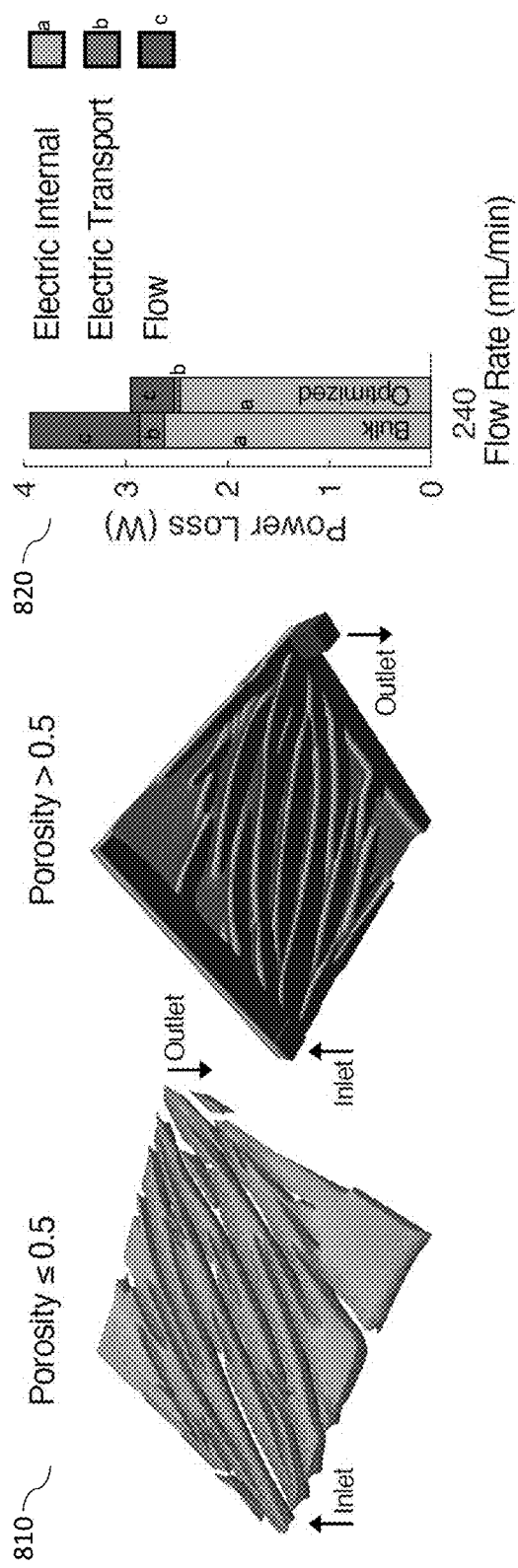
FIG. 8 shows an example of architected porosity distribution and an example of the total power loss.

FIG. 8 shows an example at 810 of an architected porosity distribution for a scaled-up electrode designed for a half cell with dimensions 8 cm×8 cm×5 mm. FIG. 8 at 820 shows an example the total power loss, separated into hydraulic losses, internal electric losses, and electric transport losses for the best performing, scaled bulk electrode (first bar) and the optimized electrode (second bar).

Optimization of Large-Scale Electrodes

The electrodes analyzed above are of typical scale and have an electrode area of 4 cm². However, though these dimensions are expedient for analysis, it is often unclear how to translate performance insights realized at these smaller scales to the larger scales needed for industrial application. Industrially useful reactors are often several orders of magnitude larger. Thus, as another demonstration of the utility of the approach described here, the planar dimensions of the half-cell compartment are scaled by 16× to a size of 8 cm×8 cm×5 mm (i.e., electrode area of 64 cm²) while keeping the current density and area specific velocity fixed. The mesh resolution is constant requiring the solution of an optimization problem with ≈20M design variables. The best performing bulk electrode at 4 cm² is scaled to this new dimension and compared to an architected electrode designed at this new dimension as shown in FIG. 8 at 810.

When the bulk electrode is scaled in the absence of fluid distribution systems the power efficiency drops from Ξ=0.541 to Ξ=0.384, a 29.0% reduction. Alternatively, the architected, optimized electrode experiences a much smaller reduction in power efficiency dropping from Ξ=0.614 to Ξ=0.539, only a 12.3% reduction and thus retaining nearly all of the power efficiency upon scale-up. Equally important, the scaled-up architected electrode exceeds the power efficiency of the scaled-up bulk electrode by 40.3%.

The enhanced performance is further reflected in the power losses presented in FIG. 8 at 820. The structures in the optimized electrode again lead to lower contributions to all loss components. A bulk electrode would, in practice, also use a fluid distribution system, but it is not possible for an external manifold to arbitrarily control the detailed local flow in the interior of the electrode. Indeed, even if it were possible the target flow distribution is generally unknown and would need to be determined via laborious and time inefficient testing and iteration. In this context, the advantages of the architected electrodes described here are self-evident, the variable porosity leads to expanded design flexibility that can be readily harnessed by the computational design process to generate structures with significantly enhanced performance.

Figure 9:
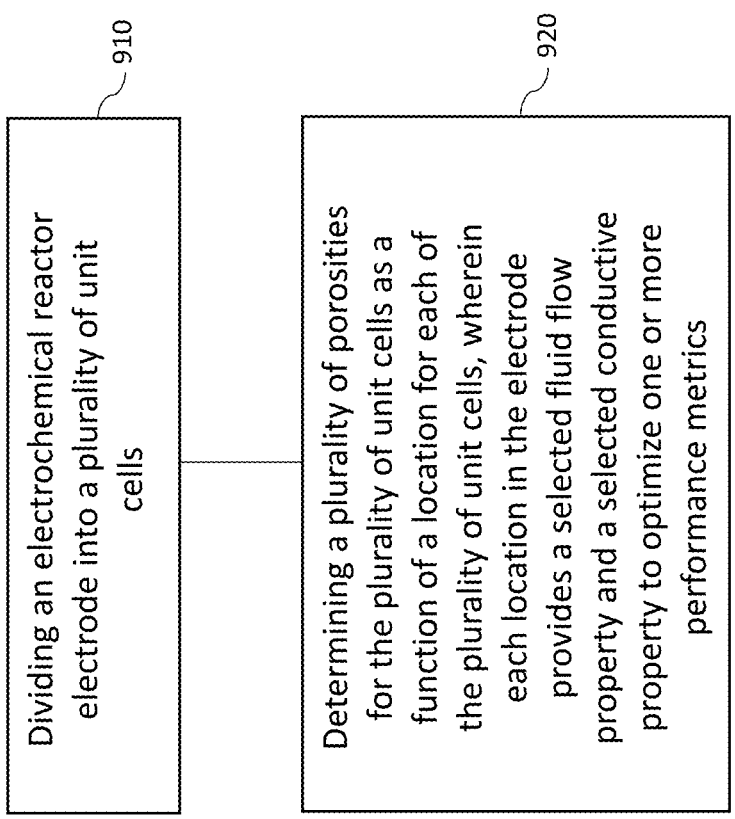
FIG. 9 depicts a process, in accordance with some example embodiments.

FIG. 9 depicts a process, in accordance with some example embodiments. At 910, the process includes dividing an electrochemical reactor electrode into a plurality of unit cells. At 920, the process includes determining a plurality of porosities for the plurality of unit cells as a function of a location for each of the plurality of unit cells, wherein each location in the electrode provides a selected fluid flow property and a selected conductive property to optimize one or more performance metrics. The process may further includes various features described above.

Figure 10:
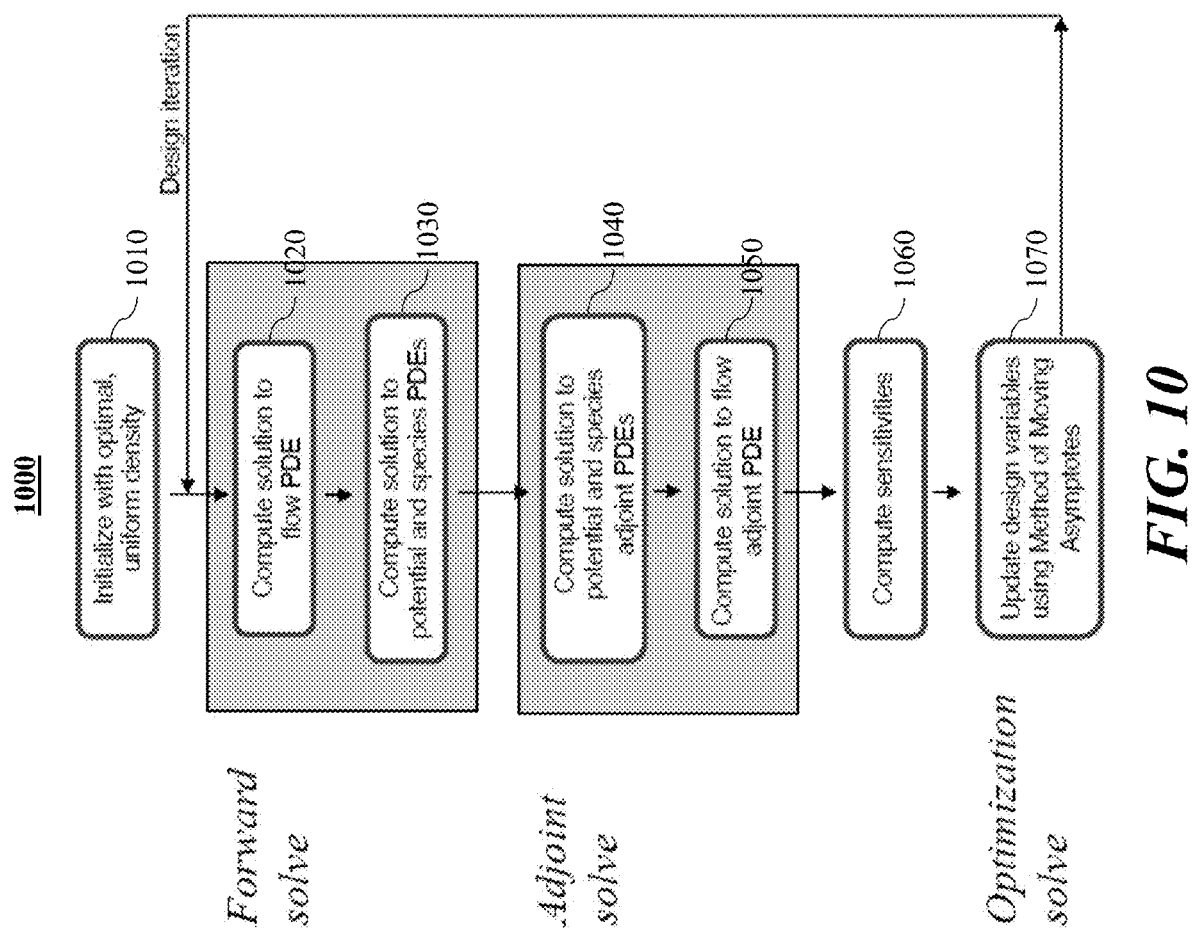
FIG. 10 depicts another process, in accordance with some example embodiments.

FIG. 10 depicts another process, in accordance with some example embodiments. At 1010, the process is initialized with an optimal and uniform density. At 1020 and 1030, the process includes a forward solver. At 1020, a solution to flow partial differential equations is determined. At 1030, a solution to potential and species partial differential equations is determined. At 1040 and 1050, the process includes an adjoint solver. At 1040, a solution to adjoint potential and species partial differential equations is determined. At 1050, a solution to adjoint flow partial differential equations is determined. At 1060, sensitivities are determined. At 1070, variables are updated. For example, a method of moving asymptotes may be used.

In some example embodiments, the subject matter described herein may be embodied in systems, apparatus, methods, and/or articles depending on the desired configuration. These various example embodiments may include implementations that use one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor and may be implemented in a high-level procedural and/or object-oriented programming language, and/or in assembly/machine language. As used herein, the term "machine-readable medium" refers to any computer program product, computer-readable medium, computer-readable storage medium, apparatus and/or device (for example, magnetic discs, optical disks, memory) used to provide machine instructions and/or data to a programmable processor, including a machine-readable medium that receives machine instructions. In the context of this document, a "machine-readable medium" may be any non-transitory media that can contain, store, communicate, propagate or transport the instructions for use by or in connection with an instruction execution system, apparatus, or device, such as a computer or data processor circuitry. A computer-readable medium may comprise a non-transitory computer-readable storage medium that may be any media that can contain or store the instructions for use by or in connection with an instruction execution system, apparatus, or device, such as a computer. Furthermore, some of the embodiments disclosed herein include computer programs configured to cause methods as disclosed herein.

Although a few variations have been described in detail above, other modifications or additions are possible. In particular, further features and/or variations may be provided in addition to those set forth herein. Moreover, the example embodiments described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. An electrochemical cell apparatus comprising:
    an electrochemical vessel;
    an electrochemical fluid contained in the electrochemical vessel; and
    a porous electrode submerged in the electrochemical fluid in the electrochemical vessel, the porous electrode being divided into a plurality of unit cells individually configured with cell-specific porosities corresponding to respective locations of the plurality of unit cells within the porous electrode,
    wherein a cell-specific porosity of each unit cell is configured based on a rod diameter of each unit cell's internal structure relative to each unit cell's cell length,
    wherein different cell-specific porosities across the plurality of unit cells inhibit electrochemical fluid flow and increase electrical conductivity in first areas of the porous electrode with decreased porosity compared to second areas, and enable increased electrochemical fluid flow and decrease electrical conductivity in the second areas of the porous electrode with increased porosity compared to the first areas.

2. The electrochemical cell apparatus of claim 1, wherein the plurality of unit cells comprises at least five unit cells.

3. The electrochemical cell apparatus of claim 2, wherein at least one unit cell compared to other unit cells has at least one of a different:
    porosity;
    surface area;
    conductivity;
    permeability; or
    mass transfer property.

4. The electrochemical cell apparatus of claim 1, wherein each unit cell's internal structure comprises one or more rods in an isotruss configuration, and wherein the rod diameter of each unit cell is selected to adjust a cell-specific porosity of the unit cell.

5. The electrochemical cell apparatus of claim 1, wherein a first unit cell having a larger rod diameter than a second unit cell causes the first unit cell to have a lower porosity than the second unit cell.

6. The electrochemical cell apparatus of claim 1, wherein a first unit cell having a larger rod diameter than a second unit cell causes the first unit cell to have a lower ohmic resistance than the second unit cell.

7. The electrochemical cell apparatus of claim 1, wherein each unit cell's internal structure configures one or more of:
- a cell-specific surface area;
- a cell-specific conductivity;
- a cell-specific permeability;
- a cell-specific mass transfer; or
- a cell-specific movability or permeation of gas bubbles.

8. The electrochemical cell apparatus of claim 1, wherein the cell-specific porosities of the plurality of unit cells are selected to adjust one or more localized features of the porous electrode comprising:
- a fluid distribution;
- an electrical resistance;
- a species reaction; or
- a flow resistance.

9. The electrochemical cell apparatus of claim 1, wherein the electrochemical cell apparatus is configured as a fuel cell.

10. The electrochemical cell apparatus of claim 1, wherein the electrochemical cell apparatus is configured as a battery.

11. The electrochemical cell apparatus of claim 1, wherein the electrochemical cell apparatus is configured as a flow-through electrochemical reactor.

12. The electrochemical cell apparatus of claim 1, wherein the electrochemical cell apparatus is configured as a flow distribution system.

13. The electrochemical cell apparatus of claim 1, wherein the electrochemical cell apparatus is configured as an electroactive component.

14. The electrochemical cell apparatus of claim 1, wherein the porous electrode is configured as a porous flowfield plate.

15. The electrochemical cell apparatus of claim 14, wherein the porous flowfield plate is positioned adjacent to an electroactive component.

16. The electrochemical cell apparatus of claim 1, wherein each of the plurality of unit cells has a dimension on at least one side thereof that is between 100 nm and 100 microns.

17. The electrochemical cell apparatus of claim 1, wherein the porous electrode has pore sizes between 100 nm and 100 microns.

18. The electrochemical cell apparatus of claim 1, wherein the electrochemical fluid comprises a mixture of a liquid and a gas, and wherein the mixture includes bubbles of the gas entrained in the liquid.

* * * * *